United States Patent
He et al.

(10) Patent No.: US 7,236,931 B2
(45) Date of Patent: Jun. 26, 2007

(54) SYSTEMS AND METHODS FOR AUTOMATIC ACOUSTIC SPEAKER ADAPTATION IN COMPUTER-ASSISTED TRANSCRIPTION SYSTEMS

(75) Inventors: Chuang He, Woburn, MA (US); Jianxiong Wu, Acton, MA (US)

(73) Assignee: USB AG, Stamford Branch, Stamford, CT (US)

( * ) Notice: Subject to any disclaimer, the term of this patent is extended or adjusted under 35 U.S.C. 154(b) by 919 days.

(21) Appl. No.: 10/424,140

(22) Filed: Apr. 28, 2003
(Under 37 CFR 1.47)

(65) Prior Publication Data

US 2004/0088162 A1 May 6, 2004

Related U.S. Application Data

(60) Provisional application No. 60/376,547, filed on May 1, 2002.

(51) Int. Cl.
*G10L 15/26* (2006.01)
(52) U.S. Cl. ............... 704/235; 704/251; 704/257; 704/270.1
(58) Field of Classification Search ............... 704/235, 704/260, 255–257, 231, 10, 270.1, 251
See application file for complete search history.

(56) References Cited

U.S. PATENT DOCUMENTS

| 5,036,539 A | 7/1991 | Wrench, Jr. et al. |
| 5,179,627 A | 1/1993 | Sweet et al. ............... 395/2 |
| 5,333,275 A | 7/1994 | Wheatley et al. ........... 395/2.52 |
| 5,513,298 A | 4/1996 | Stanford et al. |
| 5,615,296 A | 3/1997 | Standford et al. |
| 5,649,060 A | 7/1997 | Ellozy et al. ............... 395/2.87 |
| 5,664,195 A | 9/1997 | Chatterji |
| 5,687,287 A * | 11/1997 | Gandhi et al. ............... 704/247 |
| 5,727,950 A | 3/1998 | Cook et al. |
| 5,742,816 A * | 4/1998 | Barr et al. ............... 707/3 |
| 5,772,585 A | 6/1998 | Lavin et al. ............... 600/300 |
| 5,787,230 A | 7/1998 | Lee ............... 395/2.44 |

(Continued)

FOREIGN PATENT DOCUMENTS

JP    2000172483    6/2000

(Continued)

OTHER PUBLICATIONS

Elmasri/Navathe, Fundamentals of Database Systems, pp. 76-79.

(Continued)

*Primary Examiner*—Vijay Chawan
(74) *Attorney, Agent, or Firm*—Kelley Drye & Warren LLP

(57) ABSTRACT

The invention is a system and method for automatic acoustic speaker adaptation in an automatic speech recognition assisted transcription system. Partial transcripts of audio files are generated by a transcriptionist. A topic language model is generated from the partial transcripts. The topic language model is interpolated with a general language model. Automatic speech recognition is performed on the audio files by a speech recognition engine using a speaker independent acoustic model and the interpolated language model to generate semi-literal transcripts of the audio files. The semi-literal transcripts are then used with the corresponding audio files to generate a speaker dependent acoustic model in an acoustic adaptation engine.

33 Claims, 2 Drawing Sheets

Component of a computer-assisted transcription system

U.S. PATENT DOCUMENTS

| | | | |
|---|---|---|---|
| 5,797,122 A * | 8/1998 | Spies | 704/255 |
| 5,799,273 A | 8/1998 | Mitchell et al. | |
| 5,819,220 A | 10/1998 | Sarukkai et al. | |
| 5,825,978 A * | 10/1998 | Digalakis et al. | 704/256 |
| 5,839,106 A * | 11/1998 | Bellegarda | 704/257 |
| 5,848,390 A | 12/1998 | Matsumoto | 704/260 |
| 5,884,262 A | 3/1999 | Wise et al. | |
| 5,893,134 A | 4/1999 | O'Donoghue et al. | 707/536 |
| 6,058,104 A | 5/2000 | Snelling et al. | |
| 6,058,426 A | 5/2000 | Godwin et al. | |
| 6,064,957 A | 5/2000 | Brandow et al. | 704/235 |
| 6,076,059 A * | 6/2000 | Glickman et al. | 704/260 |
| 6,081,780 A | 6/2000 | Lumelsky | |
| 6,094,635 A | 7/2000 | Scholz et al. | |
| 6,101,467 A | 8/2000 | Bartosik | |
| 6,122,613 A | 9/2000 | Baker | 704/235 |
| 6,122,614 A | 9/2000 | Kahn et al. | 704/235 |
| 6,125,284 A | 9/2000 | Moore et al. | |
| 6,161,090 A * | 12/2000 | Kanevsky et al. | 704/246 |
| 6,163,794 A | 12/2000 | Lange et al. | |
| 6,173,259 B1 | 1/2001 | Bijl et al. | |
| 6,192,339 B1 | 2/2001 | Cox | |
| 6,195,641 B1 | 2/2001 | Loring et al. | 704/275 |
| 6,208,964 B1 * | 3/2001 | Sabourin | 704/244 |
| 6,260,011 B1 * | 7/2001 | Heckerman et al. | 704/235 |
| 6,263,308 B1 | 7/2001 | Heckerman et al. | 704/231 |
| 6,269,188 B1 | 7/2001 | Jamali | 382/229 |
| 6,282,652 B1 | 8/2001 | Scheifler | |
| 6,298,326 B1 | 10/2001 | Feller | 704/270 |
| 6,308,158 B1 | 10/2001 | Kuhnen et al. | 704/275 |
| 6,311,242 B1 | 10/2001 | Falkenburg et al. | |
| 6,327,568 B1 | 12/2001 | Joost | |
| 6,338,038 B1 | 1/2002 | Hanson | 704/500 |
| 6,366,882 B1 | 4/2002 | Bijl et al. | 704/235 |
| 6,374,221 B1 * | 4/2002 | Haimi-Cohen | 704/256.1 |
| 6,434,526 B1 | 8/2002 | Cilurzo et al. | |
| 6,513,010 B1 | 1/2003 | Lewin et al. | |
| 6,526,380 B1 | 2/2003 | Thelen et al. | |
| 6,535,849 B1 * | 3/2003 | Pakhomov et al. | 704/235 |
| 6,654,793 B1 | 11/2003 | Wollrath et al. | |
| 6,757,655 B1 | 6/2004 | Besling et al. | |
| 6,760,697 B1 | 7/2004 | Neumeyer et al. | |
| 6,766,294 B2 | 7/2004 | MacGinite et al. | |
| 6,785,654 B2 | 8/2004 | Cyr et al. | |
| 6,973,428 B2 * | 12/2005 | Boguraev et al. | 704/251 |
| 2001/0020226 A1 | 9/2001 | Minamino et al. | 704/251 |
| 2001/0029452 A1 | 10/2001 | Chen | 704/251 |
| 2002/0055845 A1 | 5/2002 | Ueda et al. | |
| 2002/0091527 A1 | 7/2002 | Shiau | |
| 2002/0138276 A1 | 9/2002 | Damiba | |
| 2002/0194000 A1 | 12/2002 | Bennett et al. | |
| 2003/0083879 A1 | 5/2003 | Cyr et al. | |
| 2003/0083883 A1 | 5/2003 | Cyr et al. | |
| 2004/0049385 A1 | 3/2004 | Lovance et al. | |

FOREIGN PATENT DOCUMENTS

| | | |
|---|---|---|
| JP | 20022091477 | 3/2002 |
| WO | WO 00/54252 | 9/2000 |

OTHER PUBLICATIONS

Hundt, et al., Speech Processing in Radiology, pp. 1451-1456.

F. Jelinek, Self-Organized Language Modeling for Speech Recognition, pp. 450-505.

Leggetter/Woodland, Maximum Likelihood Linear Regression for Speaker Adaptation of Continuous Density Hidden Markov Models, pp. 171-185.

Neumeyer, et al., A Comparative Study of Speaker Adaptation Techniques, pp. 1127-1130.

Shinoda, et al., Unsupervised Adaptation Using Structural Bayes Approach, pp. 793-796.

Zick, et al., Voice Recognition Software Versus a Traditional Transcription Service for Physician Charting in the ED, pp. 295-298.

Astley, et al., Customizable Middleware for Modular Distributed Software, Communication of the ACM, May 2001, 1st paragraph p. 100, inset p. 101, last ½ of center column.

Liskov, Primitive, for Distributed Computing, CS Lab, MIT, ACM SIG on Operating Systems, pp. 38, section 3.3 2$^{nd}$ paragraph; p. 35 2$^{nd}$ paragraph.

Clercq, "RPC Dynamic Port Allocation", Aug. 21, 2001, Available at www.winnetmag.com/Article/ArticleID/22206/22206.html.

Srinivasan, "Binding Protocols for ONC RPC Version 2", RFC 1833, Aug. 1995, Available at www.faqs.org/rfcs/rfc1833.html.

Srinivasan, " Remote Procedure Call Protocol Version 2", RFC 1831, Aug. 1995, Available at www.faqs.org/rfcs/rfc1831.html.

A.S. Tanenbaum, "Distributed operating systems anno 1992. What have we learned so far?", 1993, Distributed Systems Engineering 1, p. 3-10.

* cited by examiner

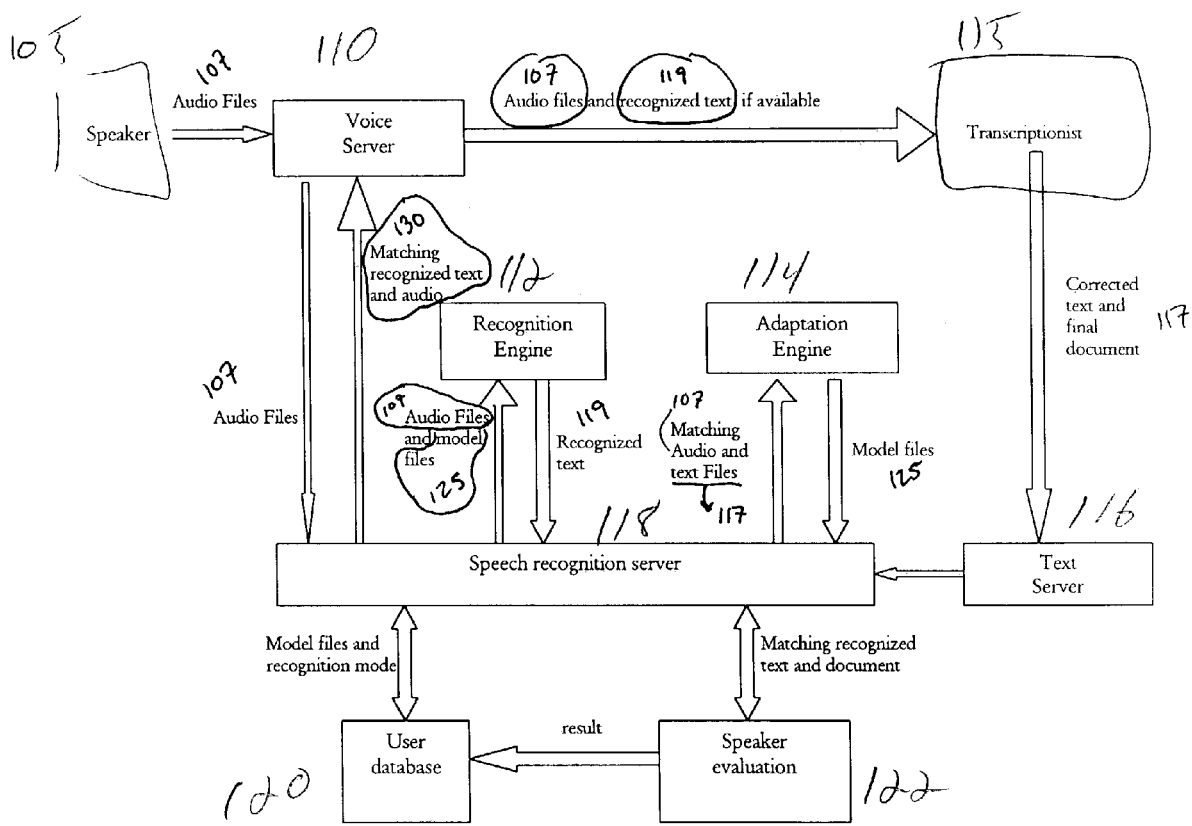
Figure 1. Component of a computer-assisted transcription system

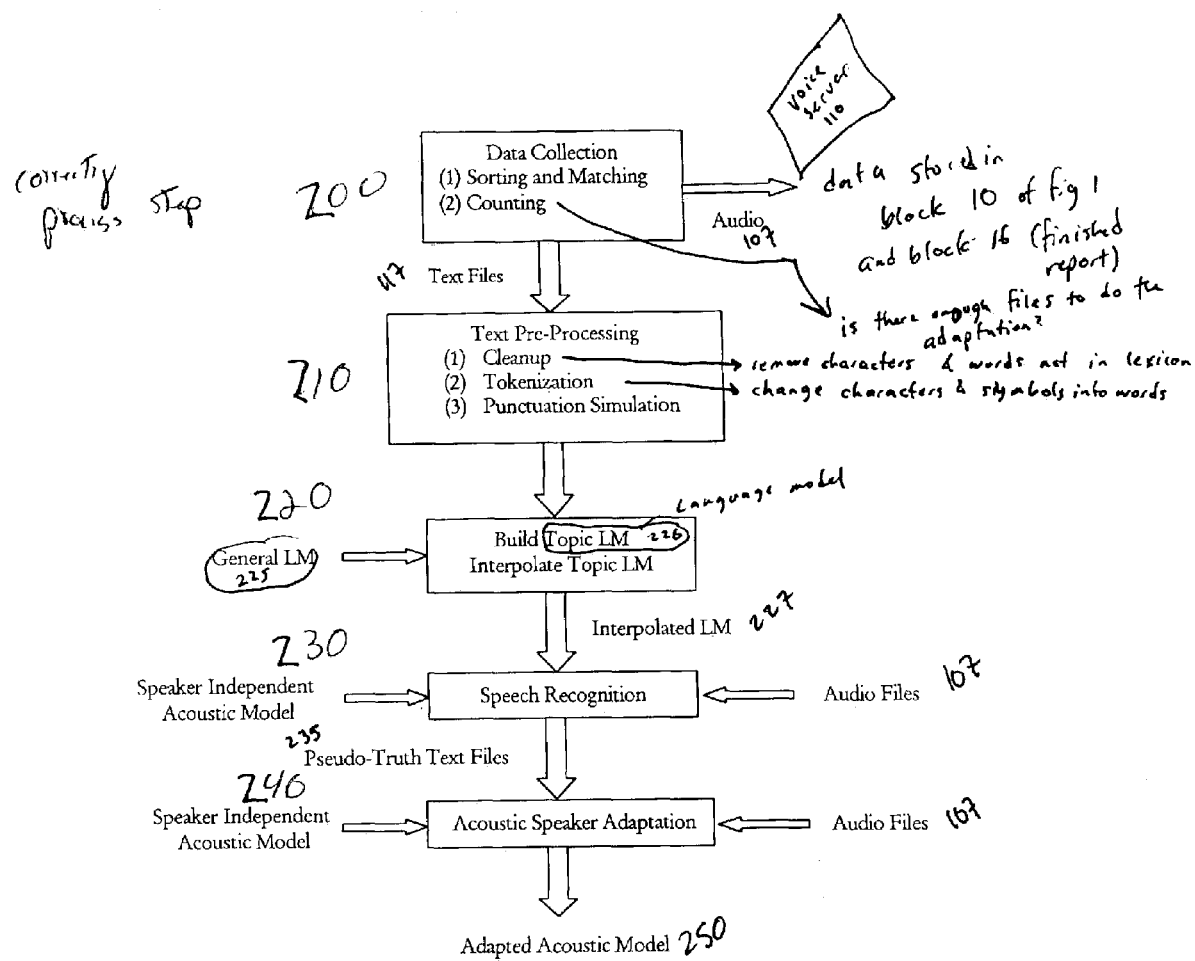
Figure 2 Diagram of Automatic Acoustic Speaker Adaptation Process

SYSTEMS AND METHODS FOR AUTOMATIC ACOUSTIC SPEAKER ADAPTATION IN COMPUTER-ASSISTED TRANSCRIPTION SYSTEMS

RELATED APPLICATIONS

This application claims the benefit of priority of U.S. Provisional Patent Application No. 60/376,547, entitled "SYSTEMS AND METHODS FOR AUTOMATIC ACOUSTIC SPEAKER ADAPTATION IN COMPUTER-ASSISTED TRANSCRIPTION SYSTEMS," filed May 1, 2002, which is herein incorporated by reference. This application is directed to subject matter related to that disclosed in co-pending U.S. patent application Ser. No. 10/424,134, entitled "SYSTEMS AND METHODS FOR EVALUATING SPEAKER SUITABILITY FOR AUTOMATIC SPEECH RECOGNITION AIDED TRANSCRIPTION," filed Apr. 28, 2003, which is herein incorporated by reference.

FIELD OF THE INVENTION

This invention relates generally to automated speech recognition technology. More specifically, this invention relates to a method for automatic acoustic speaker adaptation in automated speech recognition technology.

BACKGROUND OF THE INVENTION

Dictation devices have been in common use in many fields in which it is inconvenient or undesirable to make handwritten or typewritten notes. It was common in these fields for a user of a dictation device to make voice recordings and provide these recordings to transcriptionists, who transcribe the recordings in order to generate written transcripts of the recording for the speaker's review or for record keeping purposes. More recently, dictation technology has developed significantly and includes such tools as automated speech recognition (ASR) systems to eliminate much of the need for transcriptionists to transcribe recordings. ASR systems take input in the form of speech and derive a text of words that was most likely to have been spoken. Besides dictation systems, ASR is also becoming increasingly important in applications such as voice activated telephone menus and voice messaging systems. However, a recognized and pervasive problem in the art is that speech recognition can be unreliable, and it is often easier and even cheaper to use transcription services or live operators instead because faulty speech recognition often wastes more time than it saves. There is therefore a need for improved speech recognition systems that are more reliable and less error prone.

There are several methods of speech recognition known to those skilled in the art. Most of these methods are based on combinations of acoustic (speech) models and language models. Acoustic models can be constructed using speech from many different speakers or using speech from a particular speaker for whom the model is intended. An acoustic model constructed either a priori or using many different speakers is called a speaker independent (SI) acoustic model because the parameters of the model are not tuned to any particular speaker. Speaker independent acoustic models are usually substantially less accurate than speaker dependent (SD) acoustic models because the parameters of a SD acoustic model are adapted to a particular speaker's pronunciation and manner of speaking whereas a SI acoustic model is not. In addition to pronunciation and manner of speaking, a speaker's vocal cord length and size and shape of mouth and other physical characteristics can affect speech recognition. Furthermore, differences in signal quality due to differences in microphone input or signal transmission routes between when a recognition engine is initially programmed and when it is actually used can also affect the accuracy of automatic speech recognition. A speaker dependent acoustic model can account for these differences whereas a speaker independent acoustic model cannot. Therefore, in order to increase the accuracy of speech recognition engines, it is desirable to adapt acoustic models on which the engines are based to particular speakers with the particular conditions under which they are speaking.

There are several ways known to those skilled in the art to adapt a speech model to a particular speaker, including Bayesian maximum a posteriori (MAP) estimates, eigenvoice methods, and maximum-likelihood methods. Many of these methods are reviewed by Neumeyer et al., "A Comparative Study of Speaker Adaptation Techniques," 4*th European Conf. on Speech Communication and Technology*, pages 1127-1130, incorporated by reference.

The maximum-likelihood linear regression (MLLR) method is described in detail in C. J. Leggetter and P. C. Woodland, "Maximum likelihood linear regression for speaker adaptation of continuous density hidden Markov models," *Computer Speech and Language*, vol. 9, pages 171-185, incorporated by reference. This reference describes two methods of adapting a speech recognition engine to a particular speaker. The first method is supervised adaptation, which requires an exact or literal transcript of a recorded speech and refines the acoustic model to match the literal transcript. The second method is unsupervised adaptation, which does not require a literal transcript. In this method, the speech recognition engine transcribes the speech and that transcription is used to refine the speech model. As expected, Leggetter and Woodland report that the supervised adaptation method was superior to the unsupervised adaptation method, although both methods approached the performance of a SD based acoustic model as the number of adaptation utterances increased.

Supervised adaptation approaches require literal transcripts of a recorded speech. Thus transcriptionists are required to literally transcribe a recorded speech in order to create a text document for comparison, or alternatively, a speaker is required to read a pre-written adaptation speech. Both of these methods require time on the part of a human, thus making these methods more costly and time-consuming than unsupervised methods. Furthermore, supervised adaptation methods are not usually an option in many telephony applications in which speakers interact only briefly with the system. There is therefore a need for an unsupervised adaptive speech recognition system that does not rely on literal transcriptions and does not rely on speakers reading pre-written adaptation speeches.

One approach to adaptive speech recognition without literal transcription is found in K. Shinoda and C. -H. Lee, "Unsupervised Adaptation Using Structural Bayes Approach," *Proc. IEEE Intl. Conf on Acoustics, Speech and Signal Processing*, Seattle, Wash. (1998), incorporated herein by reference. In this approach, an automatic speech recognition system was used to generate semi-literal transcripts for adaptation. However, because the generated semi-literal transcripts contained many recognition errors, the adapted acoustical models developed using this approach did not perform as well as adapted acoustical models generated using literal transcripts or combinations of supervised adaptation followed by unsupervised adaptation. There is therefore a need for an unsupervised adaptive speech recognition system that performs better than this generated semi-literal approach.

In addition to acoustic models, speech recognition engines also typically employ language models. Language models allow speech recognition engines to take into account the fact that there are correlations between nearby words in sentences. This concept is described in detail by F. Jelinek, "Self-Organized Language Modeling for Speech Recognition," in *Language Processing for Speech Recognition* at pages 450-503, incorporated herein by reference. Language models attempt to characterize the probability that a particular word will appear at a particular location in a sentence given the identity and locations of other nearby words.

One popular set of language models is the n-gram language models. N-gram language models attempt to calculate the probability that the $n^{th}$ word in a group of words will be a particular word given the identity of the previous n−1 words. For example, the trigram language model (n=3) attempts to calculate the probability that the third word in a group of words will be a particular word given the identity of the previous two words in that group. N-gram probabilities are typically calculated based on large quantities of text, called a training corpus.

A training corpus can come from any text, and a broad range of texts can be used to generate a general language model. A topic language model can be created from texts using language in the same way as the speaker whose language is being modeled. For example, if the speaker is a physician and is speaking about medical matters, then medical texts would be the most appropriate elements of a training corpus. Or if the speaker is a lawyer speaking about legal matters, then legal texts would be most appropriate. Topic language models can be powerful predictive tools for speech recognition, yet they have not been used in speaker adaptation methods.

Another adaptive speech recognition approach involving semi-literal transcripts is set forth in S. S. Pakhomov and M. J. Schonwetter, "A Method and System for Generating Semi-Literal Transcriptions for Speech Recognition Systems," U.S. patent application Ser. No. 09/487,398, filed Jan. 18, 2000, incorporated herein by reference. This approach generates semi-literal transcripts from pre-existing partial transcripts. Partial transcripts reflect a speaker's intended text rather than what was actually spoken, thus pause-fillers (e.g., "um . . . ", "uh . . . ") are removed, dictation instructions are removed, and spoken corrections (e.g., "right . . . no, I mean left . . . ") are corrected in the text of the partial transcript. To generate a semi-literal transcript, Pakhomov et al. interpolate pause-fillers with a filled pause language model and interpolate other omitted words (such as corrections and dictation instructions) using a background language model. The semi-literal transcript so generated is then used in combination with the original audio file from which the partial transcript was generated to generate a speaker dependent model. However, the semi-literal transcripts thus generated cannot provide the accuracy required for good adaptive speech recognition. The method augments the partial transcript using a relatively simple probabilistic finite state model that limits the power of the language model. There is therefore a need for an adaptive speech recognition system that does not suffer from this limitation and can fully benefit from a sophisticated language model.

SUMMARY OF THE INVENTION

This invention includes a method for unsupervised adaptive speech recognition systems by generating semi-literal transcripts from a database containing pre-existing partial transcripts and associated audio files. This method thus allows the benefits in accuracy of having speaker dependent acoustic models without the drawbacks of requiring literal transcripts. The partial transcripts can be modified and used to generate a topic language model, which may then be interpolated with a general language model. The interpolated language model may be used with a speaker independent acoustic model to create a semi-literal transcript from an audio file. This semi-literal transcript and the audio file from which it was generated may then be used in an acoustic adaptation engine to generate a speaker dependent acoustic model tailored particularly to the speaker who created the audio file.

The invention includes a method for acoustic adaptation comprising the steps of collecting at least one audio file associated with a partial transcript of the audio file; building a topic language model from the partial transcript; interpolating the topic language model with a general language model; using a speaker-independent acoustic model and the interpolated language model in a speech recognition engine on the audio file to generate a semi-literal transcript; and generating a speaker dependent acoustic model using the semi-literal transcript and the audio file in an acoustic adaptation engine. In one aspect, the method includes the step of filtering out predetermined sections of the partial transcript to generate a filtered partial transcript. In another aspect, the method includes the step of tokenizing the text of the partial transcript. In another aspect, the method includes the steps of adding words of punctuation to the partial transcript to generate a punctuation text, removing punctuation from the partial transcript to generate a no-punctuation text, and simulating probabilities of pronounced punctuations in the topic language model by providing copies of the punctuation text and the no-punctuation text in a predetermined proportion. In another aspect, the method includes the step of counting a number of audio files and associated partial transcripts. In another aspect, the steps of building, interpolating, using, and generating are performed after a predetermined number of audio files and associated partial transcripts have been counted in the counting step. In another aspect, the topic language model and the general language model comprise n-gram word statistics. In another aspect, the topic language model and the general language model comprise trigram word statistics.

The invention includes a system for acoustic adaptation comprising a voice server for storing at least one audio file, wherein the audio file is stored according to the identity of the speaker; a text server for storing at least one transcription associated with the at least one audio file; a speech recognition engine for receiving audio files, acoustic models, and language models, and outputting text files; an acoustic adaptation engine for receiving audio files and associated text files and outputting acoustic model files; and a speech recognition server for sending audio files to the speech recognition engine and the acoustic adaptation engine and for sending text files to the acoustic adaptation engine; wherein the speech recognition server receives an audio file and an associated partial transcript of the audio file, builds a topic language model from the partial transcript, interpolates the topic language model with a general language model to generate and interpolated language model; wherein the speech recognition engine uses the interpolates language model and a speaker independent acoustic model to generate a semi-literal transcript from an audio file; and wherein the acoustic adaptation engine uses the semi-literal transcript and the audio file to generate a speaker dependent acoustic model. In one aspect, the system further comprises a counter for counting a number of audio files for a particular speaker, wherein the topic language model is generated after the counter has counted a predetermined number of audio files for the particular speaker. In another aspect, the system further comprises a counter for counting a number of audio files for a plurality of speakers, wherein the topic language model is generated after the counter has counted a predetermined number of audio files for the plurality of speakers. In another aspect, the topic language model and the general language model comprise n-gram word statistics. In another aspect, the topic language model and the general language model comprise trigram word statistics. In another aspect, the topic language model is created using copies of a punctuation text and a no-punctuation text in a predetermined proportion.

The invention includes a system for acoustic adaptation comprising a means for collecting at least one audio file associated with a partial transcript of the audio file; a means for building a topic language model from the partial transcript; a means for interpolating the topic language model with a general language model; a means for generating a semi-literal transcript using a speaker-independent acoustic model and the interpolated language model; and a means for generating a speaker dependent acoustic model using the semi-literal transcript and the audio file. In one aspect, the system further comprises a means for filtering out predetermined sections of the partial transcript to generate a filtered partial transcript. In another aspect, the system further comprises a means for tokenizing the text of the partial transcript. In another aspect, the system further comprises a means for simulating the probabilities of pronounced punctuations in the topic language model. In another aspect, the system further comprises a means for counting a number of audio files and associated partial transcripts. In another aspect, the topic language model and the general language model comprise n-gram word statistics. In another aspect, the topic language model and the general language model comprise trigram word statistics.

The invention includes a method for creating an interpolated language model for speech recognition, the method comprising the steps of collecting at least one audio file associated with a partial transcript of that audio file; filtering out predetermined sections of the partial transcript; normalizing the text of the partial transcript; creating a first and a second copy of the partial transcript; removing punctuation from the first copy of the partial transcript; adding punctuation as words to the second copy of the partial transcript; merging the first and second copies of the partial transcript to create a semi-literal transcript, wherein the first and second copies of the partial transcript are selectively weighed according to at least one predetermined probability factor; building a topic language model from the semi-literal transcript; and interpolating the topic language model with a general language model to create an interpolated language model. In one aspect, the language model is used in unsupervised acoustic adaptation. In another aspect, the method further comprises the step of counting a number of audio files and associated partial transcripts. In another aspect, the steps of building and interpolating are carried out after a predetermined number of audio files and associated partial transcripts have been counted in the counting step. In another aspect, all of the audio files are from a single speaker. In another aspect, the audio files are from two or more speakers. In another aspect, the topic language model and the general language model comprise n-gram word statistics. In another aspect, the topic language model and the general language model comprise trigram word statistics.

The invention includes a method for acoustic adaptation comprising the steps of collecting at least one audio file associated with a partial transcript of the audio file; counting a number of audio files and associated partial transcripts; filtering out predetermined sections of the partial transcript; tokenizing the text of the partial transcript; removing punctuation from a first copy of the partial transcript; adding punctuation as words to a second copy of the partial transcript; building a topic language model from the first and second copies of the partial transcript selectively weighed according to a predetermined probability factor, wherein the topic model comprises trigram word statistics; interpolating the topic language model with a general language model, wherein the general language model comprises trigram word statistics; using a speaker-independent acoustic model and the interpolated language model in a speech recognition engine on the audio file to generate a semi-literal transcript; and generating a speaker dependent acoustic model using the semi-literal transcript and the audio file in an acoustic adaptation engine, wherein the steps of building, interpolating, using, and generating are performed after a predetermined number of audio files and associated partial transcripts have been counted in the counting step.

The invention includes a system for acoustic adaptation comprising a voice server for storing at least one audio file, wherein the audio file is stored according to the identity of the speaker; a text server for storing at least one transcription associated with the at least one audio file; a counter for counting a number of audio files for a particular speaker; a speech recognition engine for receiving audio files, acoustic models, and language models, and outputting text files; an acoustic adaptation engine for receiving audio files and associated text files and outputting acoustic model files; and a speech recognition server for sending audio files to the speech recognition engine and the acoustic adaptation engine and for sending text files to the acoustic adaptation engine; wherein the speech recognition server receives an audio file and an associated partial transcript of the audio file, builds a topic language model comprising trigram word statistics from copies of a punctuation text and a no-punctuation text in a predetermined proportion after the counter has counted a predetermined number of audio files for the particular speaker, and interpolates the topic language model with a general language model comprising trigram word statistics to generate and interpolated language model; wherein the speech recognition engine uses the interpolates language model and a speaker independent acoustic model to generate a semi-literal transcript from an audio file; and wherein the acoustic adaptation engine uses the semi-literal transcript and the audio file to generate a speaker dependent acoustic model.

BRIEF DESCRIPTION OF THE DRAWINGS

FIG. 1 is a block diagram showing one embodiment of a computer assisted transcription system that may be used with the invention.

FIG. 2 is a block diagram showing the steps in one embodiment of the method of the invention.

DETAILED DESCRIPTION OF THE PREFERRED EMBODIMENTS

In one aspect, the invention includes a method for unsupervised acoustic adaptation. At least one audio file, the first audio file, may be associated with a partial transcript of the audio file. The first audio file and its associated partial transcript may be collected from a server used to store audio files. The stored audio files may be labeled according to the identity of the speakers who generated the files, or possibly also by other identifying information such as date and time the files were generated or a title or topic of the subject of the audio file, for example. A topic language model may be built from the partial transcript using any method known to those in the art, for example by a statistical analysis of n-gram word probabilities. Preferably, a topic language model is constructed by statistical analysis of the trigram word probabilities in the partial transcript. The topic language model may then be interpolated with a general language model, which can be any pre-existing general language model, to generate an interpolated language model.

A second audio file, which may preferably be the same audio file associated with the partial transcript, but may generally be any audio file generated by the same or a different speaker, may be subjected to speech recognition by a speech recognition engine. The speech recognition engine may use a speaker independent acoustic model and the interpolated language model to generate a semi-literal transcript of the second audio file. The semi-literal transcript and the second audio file may then be provided to an acoustic adaptation engine, which can provide a speaker dependent acoustic model particular to the speaker who created the second audio file.

In one embodiment, the partial transcript may be processed in one or more of the ways described below before a topic language model is built from it. Predetermined sections of the partial transcript may be filtered out from it to generate a filtered partial transcript. The partial transcript may be a final version of what a speaker had in mind, as anticipated by a transcriptionist. The partial transcript may thus include portions which were not actually spoken by the speaker, but were intended to be part of the final document. For example, the transcriptionist may add headers or footers, headings, or boilerplate language to the partial transcript, but these may not have been spoken in the audio file. The filtering step may remove the portions of the partial transcript that are known to not have been spoken by the speaker because, for example, they may have been part of a form document that the speaker was filling out.

Another step for processing the partial transcript may involve tokenizing or normalizing the partial transcript to transform the text by reformatting it into a format that complies with the requirements for the system that generates language models. The tokenizing step may involve parsing the partial transcript file to identify the words it contains and associate those words with token data representations that are recognized by the system for generating language models.

Another step for processing the partial transcript may involve adding words to the partial transcript to simulate probabilities of pronounced punctuations. If a speaker is in the habit of directing a transcriptionist to insert punctuation by explicitly pronouncing punctuation such as "period," "comma," "quote," "new paragraph," "open parenthesis," and "closed parenthesis," for example, then these probabilities can be taken into consideration in a topic language model by making them explicit in the transcript used to generate a topic language model. In one embodiment, pronounced punctuation can be added to the partial transcript for example by reference to the audio file from which the partial transcript was generated or by a speaker-dependent lookup table created by a transcriptionist or other person familiar with the speakers' dictation habits. In a preferred embodiment, all of the punctuation may be removed from a copy of a partial transcript to generate a no-punctuation text copy of the partial transcript, and all of the punctuation may be spelled out in a copy of a partial transcript to generate a punctuation text copy of the partial transcript. Copies of the no-punctuation text copy of the partial transcript and the punctuation text copy of the partial transcript may then be used in a predetermined proportion to simulate the probability that punctuation will be pronounced.

Topic language models are generally improved by reference to a greater training corpus text. Thus, in one aspect, the invention may include a counter for counting the number of partial transcripts that are used to create a topic language model. The counter may count the number of partial transcripts or it may count some other relevant quantity, such as a number of pages of transcripts or a number of lines or a number of words. Once the counter has reached a predetermined value, thus indicating that a predetermined number of transcripts are available for creating a topic language model, the method can proceed and a topic language model may be created from the counted transcripts.

In another embodiment, the invention may include a system for unsupervised acoustic adaptation. The system includes a voice server, which stores audio files. Preferably, the audio files can be stored and accessible by reference to a label that identifies the speaker who created the audio file, as well as by other identifying information such as date and time the files were generated or a title or topic of the subject of the audio file, for example. Newly created audio files may be sent to the voice server for storage. Copies of newly created audio files may be sent to transcriptionist, who can use the audio files to create partial or literal transcripts. Alternatively, if an audio file has been subjected to speech recognition, the audio file may be sent by the voice server along with the recognition transcript to a transcriptionist, who can then edit the recognition transcript to create a partial or literal transcript.

The system of the invention may also include a text server for storing transcriptions associated with the audio files. The text server may receive and store partial, literal, and semi-literal transcripts. When a transcriptionist has transcribed an audio file, the transcribed file may be sent to the text server. The text server may store text files according to labels that allow the text files to be associated with the corresponding audio files from which they were generated. Text files may be stored and accessible by reference to a label that identifies the speaker who created the corresponding audio file, as well as by other identifying information such as date and time the files were generated or a title or topic of the subject of the text file, for example.

The system of the invention may include a speech recognition engine for receiving audio files from a speech recognition server and providing transcriptions of the audio files. The speech recognition engine may use acoustic and language models in recognizing speech. The acoustic models allow the speech recognition engine to recognize particular sounds and to assemble the sounds into the words that were most likely spoken to make those sounds. The language models allow the speech recognition engine to take into account the correlations between words in a string of words. For audio files generated by a particular speaker, the speech recognition engine is more likely to be accurate when the acoustic model is a speaker dependent acoustic model tuned to the particular speaker. For audio files whose subject matter is specialized, the speech recognition engine is more likely to be accurate when the language model includes a topic language model directed to the specialized subject matter.

The system of the invention may include an acoustic adaptation engine for receiving audio files and their associated text files from a speech recognition server. The acoustic adaptation engine can parse the sounds in the audio file and associate those sounds with the words in the associated text files to generate a model of how the speaker makes the sounds associated with the elements of spoken words. The result is a speaker dependent acoustic model file. The speaker dependent acoustic model file may be stored in a database and labeled with the identity of the speaker or any other appropriate identifier. When audio files generated by a particular speaker are subjected to speech recognition, the speech recognition server can access the database to determine whether a speaker dependent acoustic model file exists for that user, and if so, the speaker dependent acoustic model file can be used by the speech recognition engine in its automated transcriptions of that speaker's audio files.

The system of the invention may include a counter for counting a number of audio files and associated partial transcript files available for a particular speaker. The counter may be as simple as a variable in a software program that increments by one for each partial transcript that exists for each user. The counter may, however, be more complicated and may count the number of words in each transcript, or any other meaningful quantity for measuring the amount of information available for creating a topic language model. Once the counter has reached a predetermined value, the system can proceed with creating the topic language model. The predetermined value may be chosen with regard to how many words or transcripts would be enough to assemble a topic language model that adequately samples enough n-gram word combinations to generate an adequate number of n-gram probabilities to generate a meaningful language model. Preferably, the counter may include only those transcripts generated by a particular speaker for which unsupervised acoustic adaptation is desired. However, in an alternative embodiment, the counter may include transcripts generated by multiple speakers who use the system. Preferably, if the counter includes transcripts generated by speakers who use the system, all of the included transcripts may be about the same topic rather than a great diversity of topics.

In one embodiment, the invention may include a method for generating semi-literal transcripts from partial transcripts and associated audio files and using these semi-literal transcripts to adapt an acoustic model to a particular speaker, thus creating a speaker dependent acoustic model. In another embodiment, the invention may include a system employing this method. The invention includes systems and methods for training speech recognition engines to adapt to particular users without requiring the particular users to read prewritten texts and without requiring transcriptionists to generate literal transcripts. The systems and methods of the invention instead make use of partial transcripts, which are transcripts that are intended to be the final product of a speaker's dictation and which exclude dictation commands and corrections. In a preferred embodiment, the partial transcripts are pre-existing partial transcripts.

The partial transcripts may be augmented to include pronounced punctuations. If during dictation a speaker says "period," "comma," or "quote," for example, but these words are left out of the partial transcript because the transcriptionist understands them to be dictation commands to insert the named punctuation, these words may be put into the augmented transcript. The original audio file may be provided to a speech recognition engine employing a speaker independent acoustic model. When pronounced punctuation words are detected by the speech recognition engine but do not appear in the partial transcript, these words may be inserted in the appropriate place within the partial transcript.

In a preferred embodiment, pronounced punctuations may be taken into account in the topic language model by creating two texts of a partial transcript. One of the texts, the punctuation text, may have most or all of the punctuation included in the partial transcript spelled out as words, as if the speaker had spoken all of the punctuation included in the partial transcript. The other of the texts, the no-punctuation text, may none or almost none of the punctuation included in the partial transcript spelled out as words, as if the speaker had spoken none of the punctuation included in the partial transcript. A probability that the speaker would pronounce punctuation may be determined, for example, by a statistical analysis of literal transcripts generated for that speaker. Alternatively, a probability that any speaker would pronounce punctuation may be determined by a statistical analysis of literal transcripts generated by a number of speakers. However the probability of pronounced punctuation is derived, the probability of pronounced punctuation can be included in a topic language model by deriving that model from the punctuation and the no-punctuation texts. For example, if it is determined that the probability that punctuation will be spoken is 10%, then a topic language model can be generated using 9 copies of the no-punctuation text and 1 copy of the punctuation text.

The invention may include a counter to determine whether the number of augmented transcripts corresponding to transcribed audio files from a particular speaker are sufficient according to some predetermined criteria to build a topic language model for that speaker. The counter may count the number of transcripts with each transcript counting as one unit, or may weigh transcripts more or less depending on their lengths with longer transcripts counting more than shorter ones. If the number of augmented transcripts is sufficient to build a topic language model for that speaker, then a topic language model can be built using the augmented transcripts as the training corpus to generate n-gram probabilities, preferably trigram probabilities, using methods known to those skilled in the art.

In one embodiment, a topic language model may be generated exclusively from transcripts from a single speaker, thus individual speakers who use the system will have their own topic language models. In another embodiment, a topic language model may be generated using only a single transcript from a single speaker, and this transcript may be used in the adaptation process. In an alternative embodiment, a single topic language model may be generated from transcripts from a group of speakers. In this alternative embodiment, the counter may count the total number of transcripts available from all users in that group in order to determine if a sufficient number of transcripts is available.

The topic language model generated using the augmented transcripts may then be interpolated with a general language model. The resulting interpolated language model is a focused language model for a speech recognition engine during recognition of the recorded speech to be used for adaptation. The interpolated language model is flexible enough to recognize words and word combinations not in the topic language model but in the general language model. Using this interpolated language model in speech recognition ensures that the recognition engine can achieve a very high speech recognition accuracy in generating a semi-literal transcript using a speaker independent acoustic model even for hard-to-recognize audio signals. This high level of recognition accuracy can be essential to the success of the acoustic adaptation using semi-literal transcripts, but such a high level of accuracy is typically impossible using just a general language model.

The interpolated language model may be used with a speaker independent acoustic model to generate a semi-literal transcript from a pre-recorded audio file. In one embodiment, the pre-recorded audio file corresponds to a transcript used to generate the topic language model that is part of the interpolated language model. The semi-literal transcript and the corresponding pre-recorded audio file may be used in an acoustic adaptation engine to generate a set of parameters for an acoustic model to make a speaker dependent acoustic model tuned to the particular speaker who generated the pre-recorded audio file.

FIG. 1 is a block diagram showing a system suitable for employing the method of the invention. A speaker 105 may dictate a speech into a suitable recording device. The speech may be digitized, and an audio file 107 may be created. The audio file 107 may be stored in a voice server 110 until it can be transcribed by a transcriptionist 115 or processed by the speech recognition server 118. The transcriptionist can create a partial transcript 117 containing the text and formatting intended by the speaker 105. The partial transcript 117 may be stored on a text server 116 until it is needed by the speech recognition server 118.

The speech recognition server 118 can coordinate the different components of the speech recognition system. The speech recognition server 118 may pull audio files 107 from the voice server 110 and may send those audio files 107 to the recognition engine 112. The recognition engine may generate recognized text files 119 from the audio files 107. The speech recognition server 118 may then send matching audio and recognized text files 130 to the voice server, where the file pairs 130 can be stored until they can be edited by a transcriptionist 115. The transcriptionist may edit the recognized text files while listening to the corresponding audio file to generate a partial transcript 117, which may be stored on the text server 116.

An adaptation engine 114 can be part of the system, thus allowing the modification of the recognition engine for acoustic speaker adaptation. Matching audio files 107 and partial text files 117 may be sent by the speech recognition server 118 to the adaptation engine 114. The adaptation engine may use both files to generate a model file 125 that may be unique to the particular user who created the audio files used as inputs for the adaptation engine. The model file 125 may be sent to the recognition engine, where the parameters of the model used by the recognition engine can be optimized for the speaker who created the audio file 107. Preferably, multiple sets of audio files 107 and partial text files 117 for the same speaker may be sent to the adaptation engine 114 for the creation of a model file 125 for that speaker.

In a preferred embodiment, the system of the invention includes a component that allows the system to evaluate whether a particular speaker is suitable for automated speech recognition. This embodiment is described in greater detail in co-pending patent application Ser. No. 10/424,134, entitled "Systems and Methods for Evaluating Speaker Suitability for Automatic Speech Recognition," incorporated herein by reference. In this embodiment, a recognized text document 119 and a corresponding partial transcript document 117 may be sent to a speaker evaluator 122, which may evaluate the suitability of the speaker for speech recognition based on identified differences between the recognized text document 119 and the corresponding partial transcript document 117 or based on other criteria. The result of this evaluation is stored in a user database 120. The speech recognition server 118 can then access the contents of the user database to determine whether to send a particular speaker's audio files 107 to a recognition engine 112 to generate a recognized text file, or to send that speaker's audio files 107 to a transcriptionist 115 to generate a partial transcript, or to send that speaker's audio files 107 first to a recognition engine 112 to generate a recognized text file and then to a transcriptionist 115 to edit that recognized text file, thus generating a partial transcript.

FIG. 2 is a block diagram showing an embodiment of the automatic acoustic speaker adaptation process of the invention. The process may begin with the data collection steps 200, in which pre-existing audio and partial transcript files may be sorted and matched so that the audio file from which a partial transcript file was generated may be associated with that partial transcript file. The number of audio/partial transcript file pairs may be counted for each speaker who uses the system in order to determine whether there are a sufficient number of files (according to some predetermined standard) available for any particular speaker to proceed with adaptation of the acoustic model for that particular speaker. The audio files 107 may be stored on the voice server 110.

The partial transcript files may be pre-processed 210 into augmented partial transcript files for input into the adaptation engine. Pre-processing may comprise: (1) a cleanup step for removing characters and words that are not in the lexicon of the adaptation engine; (2) a tokenization step, which includes changing characters and symbols in the partial transcript into the spoken words that the speaker most likely used to indicate those characters and symbols (e.g., "one hundred dollars" would be substituted for "$100" in the partial transcript), and (3) a punctuation simulation step to add words indicating punctuation to the partial transcript, where the words were most likely interpreted by the transcriptionist as instructions from the speaker in the original audio file to add the punctuation.

A language model may be generated as represented by box 220. This language model may be the result of an interpolation of a general language model and a topic language model 226. The topic language model 226 can be built in any way known to those skilled in the art using any relevant text file. In a preferred embodiment, the topic language model 226 may be constructed from the augmented partial transcript file using methods known to the skilled. The topic language model may be interpolated with a general language model 225 to create an interpolated language model 227.

The audio file associated with the original partial transcript file may be passed to the speech recognition engine in step 230. The speech recognition engine uses a speaker independent acoustical model and the interpolated language model 227 to generate a pseudo-truth text file 235. This pseudo-truth text file may then be used instead of a literal transcript for acoustic adaptation. Thus, the pseudo-truth text file 235 and the corresponding audio file 107 may be provided as input to the acoustic adaptation engine 240, which may then create an adapted acoustic model 250 to be input in the speech recognition engine to adapt the recognition engine to the particular speaker for future speech recognition activities.

While various embodiments of the invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method for acoustic adaptation comprising the steps of: collecting at least one audio file associated with a partial transcript of the audio file; building a topic language model from the partial transcript; interpolating the topic language model with a general language model; using a speaker-independent acoustic model and the interpolated language model in a speech recognition engine on the audio file to generate a semi-literal transcript; and generating a speaker dependent acoustic model using the semi-literal transcript and the audio file in an acoustic adaptation engine.

2. The method of claim 1, further comprising the step of filtering out predetermined sections of the partial transcript to generate a filtered partial transcript.

3. The method of claim 2, further comprising the step of tokenizing the text of the partial transcript.

4. The method of claim 3, further comprising the steps of adding words of punctuation to the partial transcript to generate a punctuation text, removing punctuation from the partial transcript to generate a no-punctuation text, and simulating probabilities of pronounced punctuations in the topic language model by providing copies of the punctuation text and the no-punctuation text in a predetermined proportion.

5. The method of claim 4, further comprising counting a number of audio files and associated partial transcripts.

6. The method of claim 5, wherein the steps of building, interpolating, using, and generating are performed after a predetermined number of audio files and associated partial transcripts have been counted in the counting step.

7. The method of claim 1, further comprising counting a number of audio files and associated partial transcripts.

8. The method of claim 7, wherein the steps of building, interpolating, using, and generating are performed after a predetermined number of audio files and associated partial transcripts have been counted in the counting step.

9. The method of claim 1, wherein the topic language model and the general language model comprise n-gram word statistics.

10. The method of claim 9, wherein the topic language model and the general language model comprise trigram word statistics.

11. A system for acoustic adaptation comprising: a voice server for storing at least one audio file, wherein the audio file is stored according to the identity of the speaker; a text server for storing at least one transcription associated with the at least one audio file; a speech recognition engine for receiving audio files, acoustic models, and language models, and outputting text files; an acoustic adaptation engine for receiving audio files and associated text files and outputting acoustic model files; and a speech recognition server for sending audio files to the speech recognition engine and the acoustic adaptation engine and for sending text files to the acoustic adaptation engine; wherein the speech recognition server receives an audio file and an associated partial transcript of the audio file, builds a topic language model from the partial transcript, interpolates the topic language model with a general language model to generate an interpolated language model; wherein the speech recognition engine uses the interpolate d language model and a speaker independent acoustic model to generate a semi-literal transcript from an audio file; and wherein the acoustic adaptation engine uses the semi-literal transcript and the audio file to generate a speaker dependent acoustic model.

12. The system of claim 11, further comprising a counter for counting a number of audio files for a particular speaker, wherein the topic language model is generated after the counter has counted a predetermined number of audio files for the particular speaker.

13. The system of claim 11, further comprising a counter for counting a number of audio files for a plurality of speakers, wherein the topic language model is generated after the counter has counted a predetermined number of audio files for the plurality of speakers.

14. The system of claim 11, wherein the topic language model and the general language model comprise n-gram word statistics.

15. The system of claim 14, wherein the topic language model and the general language model comprise trigram word statistics.

16. The system of claim 11, wherein the topic language model is created using copies of a punctuation text and a no-punctuation text in a predetermined proportion.

17. A system for acoustic adaptation comprising: means for collecting at least one audio file associated with a partial transcript of the audio file; means for building a topic language model from the partial transcript; means for interpolating the topic language model with a general language model; means for generating a semi-literal transcript using a speaker-independent acoustic model and the interpolated language model; and means for generating a speaker dependent acoustic model using the semi-literal transcript and the audio file.

18. The system of claim 17, further comprising a means for filtering out predetermined sections of the partial transcript to generate a filtered partial transcript.

19. The system of claim 17, further comprising a means for tokenizing the text of the partial transcript.

20. The system of claim 19, further comprising a means for simulating the probabilities of pronounced punctuations in the topic language model.

21. The system of claim 17, further comprising a means for counting a number of audio files and associated partial transcripts.

22. The system of claim 17, wherein the topic language model and the general language model comprise n-gram word statistics.

23. The system of claim 22, wherein the topic language model and the general language model comprise trigram word statistics.

24. A method for creating an interpolated language model for speech recognition, the method comprising the steps of: collecting at least one audio file associated with a partial transcript of that audio file; filtering out predetermined sections of the partial transcript; normalizing the text of the partial transcript; creating a first and a second copy of the partial transcript; removing punctuation from the first copy of the partial transcript; adding punctuation as words to the second copy of the partial transcript; merging the first and second copies of the partial transcript to create a semi-literal transcript, wherein the first and second copies of the partial transcript are selectively weighed according to at least one predetermined probability factor; building a topic language model from the semi-literal transcript; and interpolating the topic language model with a general language model to create an interpolated language model.

25. The method of claim 24, wherein the language model is used in unsupervised acoustic adaptation.

26. The method of claim 25, further comprising the step of counting a number of audio files and associated partial transcripts.

27. The method of claim 26, wherein the steps of building and interpolating are carried out after a predetermined number of audio files and associated partial transcripts have been counted in the counting step.

28. The method of claim 27, wherein all of the audio files are from a single speaker.

29. The method of claim 27, wherein the audio files are from two or more speakers.

30. The method of claim 28, wherein the topic language model and the general language model comprise n-gram word statistics.

31. The method of claim 30, wherein the topic language model and the general language model comprise trigram word statistics.

32. A method for acoustic adaptation comprising the steps of: collecting at least one audio file associated with a partial transcript of the audio file; counting a number of audio files and associated partial transcripts; filtering out predetermined sections of the partial transcript; tokenizing the text of the partial transcript; removing punctuation from a first copy of the partial transcript; adding punctuation as words to a second copy of the partial transcript; building a topic language model from the first and second copies of the partial transcript selectively weighed according to a predetermined probability factor, wherein the topic model comprises trigram word statistics; interpolating the topic language model with a general language model, wherein the general language model comprises trigram word statistics; using a speaker-independent acoustic model and the interpolated language model in a speech recognition engine on the audio file to generate a semi-literal transcript; and generating a speaker dependent acoustic model using the semi-literal transcript and the audio file in an acoustic adaptation engine, wherein the steps of building, interpolating, using, and generating are performed after a predetermined number of audio files and associated partial transcripts have been counted in the counting step.

33. A system for acoustic adaptation comprising: a voice server for storing at least one audio file, wherein the audio file is stored according to the identity of the speaker; a text server for storing at least one transcription associated with the at least one audio file; a counter for counting a number of audio files for a particular speaker; a speech recognition engine for receiving audio files, acoustic models, and language models, and outputting text files; an acoustic adaptation engine for receiving audio files and associated text files and outputting acoustic model files; and a speech recognition server for sending audio files to the speech recognition engine and the acoustic adaptation engine and for sending text files to the acoustic adaptation engine; wherein the speech recognition server receives an audio file and an associated partial transcript of the audio file, builds a topic language model comprising trigram word statistics from copies of a punctuation text and a no-punctuation text in a predetermined proportion after the counter has counted a predetermined number of audio files for the particular speaker, and interpolates the topic language model with a general language model comprising trigram word statistics to generate and interpolated language model; wherein the speech recognition engine uses the interpolates language model and a speaker independent acoustic model to generate a semi-literal transcript from an audio file; and wherein the acoustic adaptation engine uses the semi-literal transcript and the audio file to generate a speaker dependent acoustic model.

* * * * *